(12) United States Patent
Eraker et al.

(10) Patent No.: US 10,102,673 B2
(45) Date of Patent: Oct. 16, 2018

(54) IMAGE-BASED RENDERING OF REAL SPACES

(71) Applicant: Appliance Computing III, Inc., Seattle, WA (US)

(72) Inventors: David Eraker, Seattle, WA (US); Aravind Kalaiah, San Jose, CA (US); Robert McGarty, Seattle, WA (US)

(73) Assignee: APPLIANCE COMPUTING III, INC., Seattle, WA (US)

( * ) Notice: Subject to any disclaimer, the term of this patent is extended or adjusted under 35 U.S.C. 154(b) by 0 days.

(21) Appl. No.: 15/832,653

(22) Filed: Dec. 5, 2017

(65) Prior Publication Data
US 2018/0096527 A1  Apr. 5, 2018

Related U.S. Application Data

(63) Continuation of application No. 14/525,057, filed on Oct. 27, 2014, now Pat. No. 9,836,885.

(60) Provisional application No. 61/895,978, filed on Oct. 25, 2013.

(51) Int. Cl.
| | | |
|---|---|---|
| *G06T 17/00* | (2006.01) | |
| *G06T 19/00* | (2011.01) | |
| *G06T 11/60* | (2006.01) | |

(52) U.S. Cl.
CPC .......... *G06T 19/003* (2013.01); *G06T 11/60* (2013.01)

(58) Field of Classification Search
None
See application file for complete search history.

(56) References Cited

U.S. PATENT DOCUMENTS

| | | | |
|---|---|---|---|
| 9,013,505 B1 * | 4/2015 | Thornton | G09G 5/36 345/419 |
| 2013/0222369 A1 * | 8/2013 | Huston | G06T 17/00 345/419 |

* cited by examiner

*Primary Examiner* — Frank Chen (57) ABSTRACT

Under an embodiment of the invention, an image capturing and processing system creates 3D image-based rendering (IBR) for real estate. The system provides image-based rendering of real property, the computer system including a user interface for visually presenting an image-based rendering of a real property to a user; and a processor to obtain two or more photorealistic viewpoints from ground truth image data capture locations; combine and process two or more instances of ground truth image data to create a plurality of synthesized viewpoints; and visually present a viewpoint in a virtual model of the real property on the user interface, the virtual model including photorealistic viewpoints and synthesized viewpoints.

19 Claims, 8 Drawing Sheets

IMAGE-BASED RENDERING OF REAL SPACES

This application is a continuation of U.S. patent application Ser. No. 14/525,057, filed Oct. 27, 2014, now U.S. Pat. No. 9,836,885, issued on Dec. 5, 2017, which claims the benefit of U.S. Provisional Patent Application No. 61/895,978, filed Oct. 25, 2013, and titled "Image Based Rendering". This application is related to U.S. patent application Ser. No. 14/525,052, filed Oct. 27, 2014, entitled "USER INTERFACE FOR IMAGE-BASED RENDERING OF VIRTUAL TOURS", U.S. patent application Ser. No. 14/525,059, filed Oct. 27, 2014, entitled "IMAGE-BASED RENDERING OF VIRTUAL MODELS OF REAL SPACES", and U.S. patent application Ser. No. 14/525,060, filed Oct. 27, 2014, entitled "IMAGE-BASED RENDERING OF THREE DIMENSION GEOMETRIES", commonly assigned. The above U.S. patent applications are fully incorporated herein by reference.

TECHNICAL FIELD

This disclosure relates generally to methods and systems for image-based rendering and, more particularly, relates to the creation and rendering of three dimensional geometry combined with images of real world scenes.

BACKGROUND

Real estate websites typically have a description of the real estate listed for sale on the website. The description often includes pictures of the real estate in addition to a written description of the property. Photographs of the property are helpful and an improvement over a text description. However, without physically visiting the property to look at it, the property can only be seen from the viewpoint of the photographer and lack spatial navigation. So photographs, while helpful, have not eliminated the need to physically go to the property and understand how it is laid out.

Some real estate websites have posted video tours of their listed properties, which can be even more helpful than photographs. Often these videos are created by a realtor or home-owner who walks through the home while recording with a video camera. The quality of those videos is generally not good, so some realtors will use professional videographers to create a more polished and professional video. Unfortunately, videos are likewise limited in the sense that the viewer can only see the property from the viewpoint of the videographer. Also, the viewer does not have the ability to tour the property on his own route because the videos have a predetermined path through the house.

In an attempt to allow the viewer to have more control over what he can observe, some real estate websites have used panorama cameras to take panoramic photos of the properties. This has the advantage that, from the location at which the panorama was taken, the viewer can "rotate" his viewpoint, thus observing the entire panoramic photo. These panoramas have the advantage that they give a more "in-person" feel to looking at the property than traditional photos or videos. However, the location of the viewpoint is still restricted to the location at which the panorama photo was taken.

From the buyer's perspective, real estate websites suffer from numerous problems at present. First among these is the typical gallery of photographs of the property. Usually, the photographs are taken by the real estate agent or homeowner and are intended to highlight the positive attributes of the property while minimizing any negative attributes. The photo galleries are usually navigated linearly, by proceeding from one two-dimensional photograph to the next. Lastly, the viewer is restricted to the viewpoint of the available photographs. To get a different viewpoint, the buyer must visit the property in person.

Potential home buyers suffer from a lack of real estate information and tools. Many real estate brokerage websites provide some photographs of the properties in their listings. However, these websites remain surprisingly poor at providing comprehensive visual and spatial information about properties.

There is a need for a system that overcomes limitations of the current methods of creating virtual models of real properties, as well as providing additional benefits.

SUMMARY

A brief summary of some embodiments and aspects of the invention are first presented. Some simplifications and omissions may be made in the following summary; the summary is intended to highlight and introduce some aspects of the disclosed embodiments, but not to limit the scope of the invention. Thereafter, a detailed description of illustrated embodiments is presented, which will permit one skilled in the relevant art to make and use aspects of the invention. One skilled in the relevant art can obtain a full appreciation of aspects of the invention from the subsequent detailed description, read together with the Figures, and from the claims (which follow the detailed description).

In one embodiment of the invention, a three dimensional model of a real scene is constructed from image data such as spherical panoramic photos, according to a plurality of image-based rendering (IBR) algorithms. Rather than use one image-based rendering algorithm throughout the three dimensional model, the location of the viewpoint in the three dimensional model may be a factor in choosing among several image based rendering algorithms. Viewpoint locations having real image data will result in photorealistic or near photorealistic panoramas. At viewpoint locations that do not have real image data, image-based rendering methods are used to generate geometric proxies that are combined with nearby image data, thus rendering synthetic views. In some embodiments, which image-based rendering algorithm is used to render the synthetic views depends on the density of the data that is collected, the camera geometry, characteristics of the real scene, and so on.

In one embodiment of the invention, a computer system provides image-based rendering of real property, the computer system including a user interface for visually presenting an image-based rendering of a real property to a user; and a processor to (i) obtain two or more photorealistic viewpoints from ground truth image data capture locations; (ii) combine and process two or more instances of ground truth image data to create a plurality of synthesized viewpoints; and (iii) visually present a viewpoint in a virtual model of the real property on the user interface, the virtual model including photorealistic viewpoints and synthesized viewpoints.

In one embodiment of the invention, a method obtains two or more photorealistic viewpoints of a real space from ground truth image data capture locations of the real space, generates a plurality of synthesized viewpoints by combining and processing two or more instances of the obtained ground truth image data, and presents, via a user interface, a viewpoint in a virtual model of the real space, the virtual model including photorealistic viewpoints and synthesized viewpoints of the real space.

Under an embodiment of the invention, a website system maintains a real estate web page. The real estate web page facilitates three-dimensional (3D) image-based rendering virtual tours of real properties through a unique user interface that provides multiple viewpoints and tour navigation tools. The website system facilitates virtual tours of real estate, such as homes, that are offered for sale via the website system. The website system can store various information about properties in which the user is interested and facilitate sharing of information with a real estate agent or other service provider (e.g., a local merchant).

The headings provided herein are for convenience only and do not necessarily affect the scope or meaning of the claimed invention.

Figure 1:
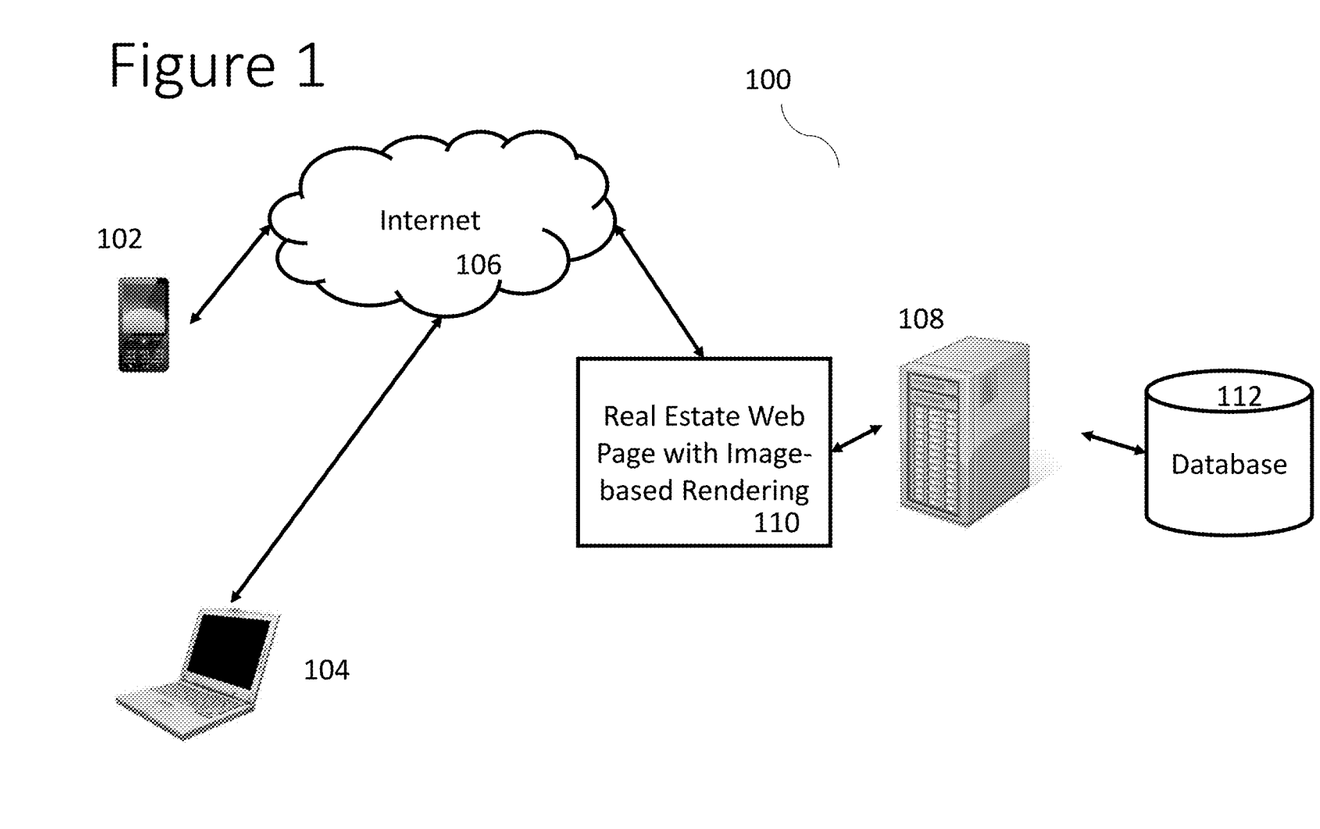
FIG. 1 shows a block diagram of an embodiment of a computer system suitable for use with the disclosed inventions.

In the drawings, the same reference numbers and acronyms identify elements or acts with the same or similar functionality for ease of understanding and convenience. To easily identify the discussion of any particular element or act, the most significant digit or digits in a reference number generally refers to the Figure number in which that element is first introduced (e.g., element 110 is first introduced and discussed with respect to FIG. 1).

DETAILED DESCRIPTION

The following description provides specific details for a thorough understanding of, and enabling description for, these embodiments of the invention. However, a person of ordinary skill in the art will understand that the invention may be practiced with many variations and these details do not list every possible variation. In some instances, well known structures and functions have not been shown or described in detail to avoid unnecessarily obscuring the description of the embodiments of the invention.

Overview

In some embodiments of the invention, a website implemented in a computer system allows users to navigate a virtual tour of a real property. Among its many uses described herein, embodiments of the website system provide a capability to tour a real property without physically visiting the property, to buy/sell/rent/lease/book the property, to store and share portions of virtual tours, and to search for objects to purchase from merchants. In some embodiments, the system displays information on the web page but other delivery methods can be used (such as streaming video or email).

Embodiments of the invention include numerous innovative informational, analytical, and collaborative tools.

Some embodiments of the user interface provide valuable data that is aggregated from system user trends. Thus property sellers can see how many system users have viewed their virtual property, what areas of the virtual tour were most interesting to the viewers, and so on. On an individual level, this "backend" data can also be used for targeted advertising. For example, if a visitor to the virtual property is viewing the kitchen, the website system might show an advertisement for an appliance store from which the refrigerator in the virtual kitchen may be purchased. Similarly, the system might show an advertisement for a furniture store that specializes in furniture in a style similar to that in which the virtual property is decorated. The web site system may have metadata on objects in the 3D virtual model. The object metadata may be used to more closely match advertisers and advertisements to viewed content. For example, if a viewer looks at an object from several viewpoints, the type of the object (e.g., cooktop) and its associated metadata (e.g., Viking, 4-burner, embodiments of the system can automatically recognize that a particular object having metadata, in this case the stovetop, that remains in the viewpoint can be used to trigger a targeted advertising system by correlating the object to an advertiser who sells the object or other products related to the object. Demographics and other data about the viewer may also be used in advertisement selection. The advertisements may be predetermined or an advertisement opportunity may be auctioned on-the-fly to a pool of advertisers who will bid for the opportunity to present an advertisement in the available advertisement location.

In some embodiments, the system includes mechanisms for collaboration between various users of the system. Shared access to select user account information and a messaging system allow users to share their "favorites" folder with their real estate agents, leave comments and questions for home sellers, receive "suggested" property tours in the users "suggested" folder, and append comments or notes that will be visible to the user.

Example Computing Environment for Image-Based Rendering of Real Spaces

Figure 8:
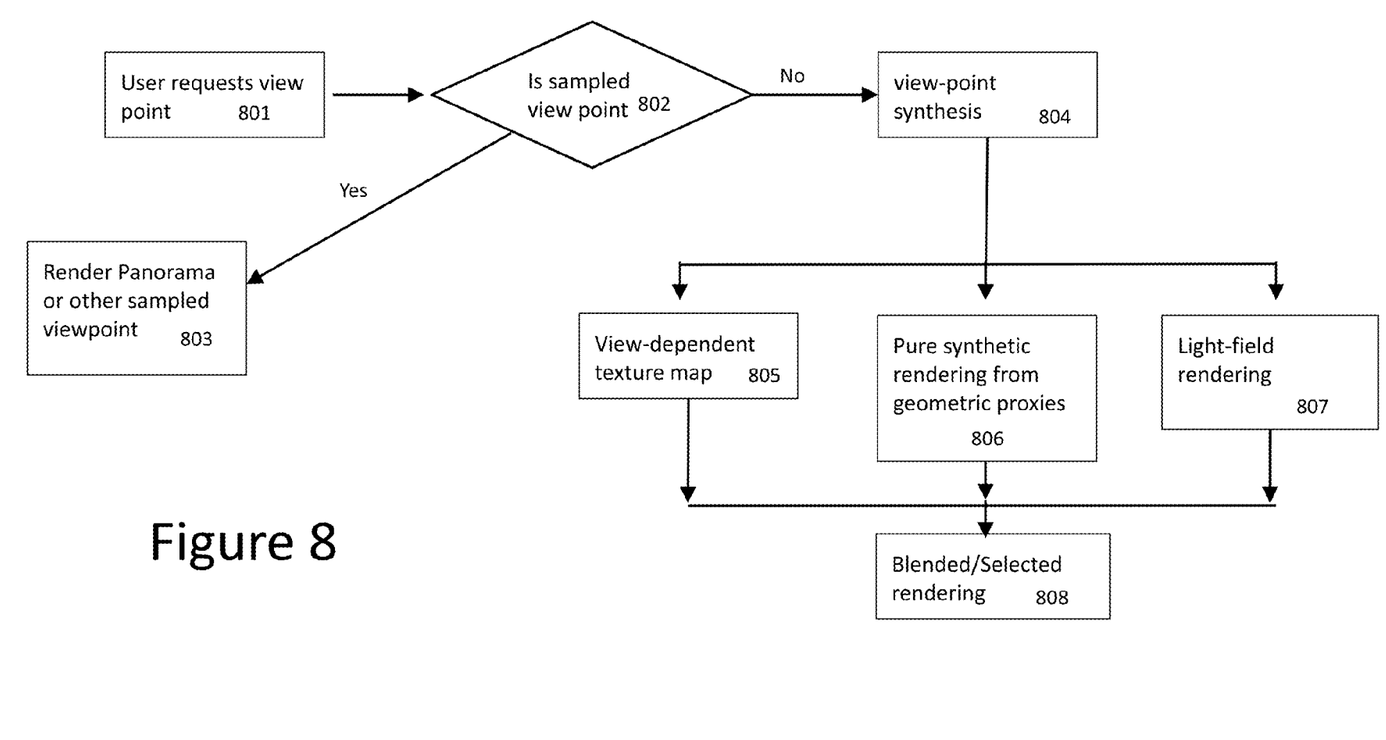
FIG. 8 shows a flow chart of a method of image-based rendering according to one embodiment of the invention.

FIG. 8 shows a block diagram of an exemplary embodiment of a system to implement the methods of image-based rendering for real estate and other real scenes disclosed herein. A user may access the virtual model via a user interface provided over the Internet 106 via a real estate webpage 110 or streamed media hosted on a remote server 108. Alternatively, the user interface may be hosted locally on smartphone 102 or mobile computer 104, either as a standalone application or cached media. When the user selects a viewpoint location in the virtual model of a real property, a rendering engine, which may be hosted on the server computer 108, will retrieve processed image data from database 112. The rendering engine will then render the requested viewpoint. In the embodiment shown, the server computer 108 will then provide requested 3D rendering to the user via real estate web page 110 and the user interface.

Figure 2:
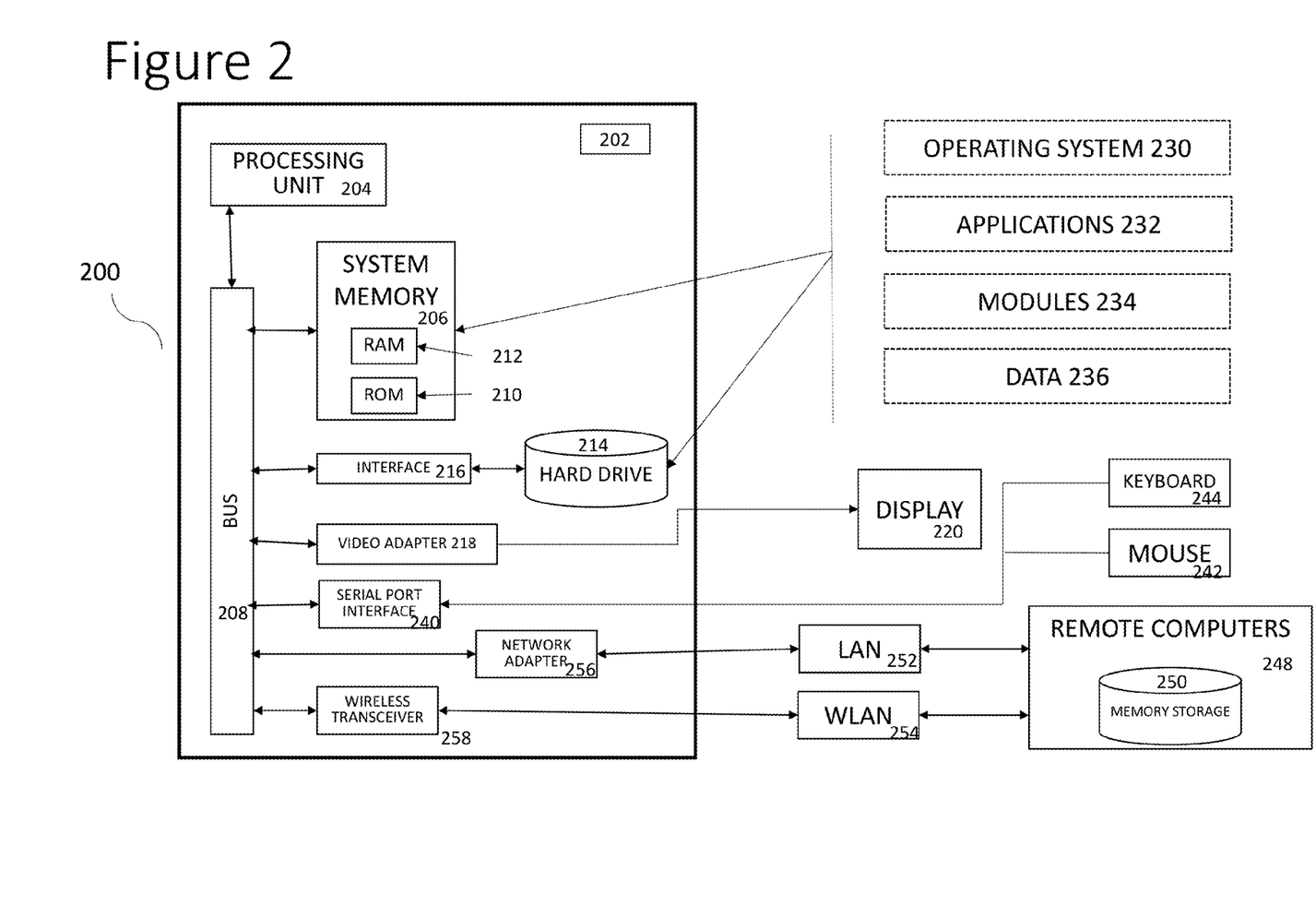
FIG. 2 shows a block diagram of a system for providing an image-based rendering of a real property according to one embodiment of the invention.

FIG. 2 shows an exemplary computing environment 200 for implementing various aspects of the disclosed inventions. The computing environment 200 includes a computer 202, the computer 202 including a processing unit 204, a system memory 206 and a system bus 208. The system bus 208 couples system components including, but not limited to, the system memory 206 to the processing unit 204. The processing unit 204 may be any of various commercially available processors. Dual microprocessors and other multiprocessor architectures may also be employed as the processing unit 204.

The system bus 208 can be any of several types of bus structure that may further interconnect to a memory bus (with or without a memory controller), a peripheral bus, and a local bus using any of a variety of commercially available bus architectures. The system memory 206 includes read only memory (ROM) 210 and random access memory (RAM) 212. A basic input/output system (BIOS) is stored in a non-volatile memory 210 such as ROM, EPROM, or EEPROM. A BIOS contains the basic routines that help to transfer information between elements within the computer 202, such as during start-up.

The computer 202 further includes a hard disk drive 214. The hard disk drive 214 can be connected to the system bus 208 by a hard disk drive interface 216. The removable storage drives (DVD drives, floppy drives, etc.) are not shown for clarity. However, the removable storage drives and their associated computer-readable media provide non-volatile storage of data, data structures, and computer-executable instructions for implementing the inventions described herein. For the computer 202, the drives and media accommodate the storage of information input by a user, or received from a remote computer, in a suitable digital format. Although the description of computer-readable media above refers to a hard disk, a removable magnetic disk, and a DVD, a person of ordinary skill in the art understands that other types of storage media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

Software applications can be stored in the drives and RAM 212. These applications can include an operating system 230, one or more application programs 232, (e.g., web browsers and client applications, etc.) other program modules 234 (e.g., cookies, etc.) and program data 236. All or portions of the operating system, applications, modules, and/or data can also be cached in the RAM 212.

Embodiments of the invention can be implemented with various commercially available operating systems or combinations of operating systems.

A user can enter commands and information into the computer 202 through a keyboard 244 and a pointing device, such as a mouse 242. For example, the user might employ the mouse to navigate a virtual tour user interface, as described herein. Other input devices (not shown) may include a microphone, an IR remote control, a joystick, a game pad, similar devices. These and other input devices are often connected to the processing unit 204 through a serial port interface 240 that is coupled to the system bus 208, but may be connected by other interfaces, such as a parallel port, a game port, a universal serial bus ("USB"), an IR interface, a wireless transceiver 258, etc. A monitor 220 or other type of display device is also connected to the system bus 208 via an interface, such as a video adapter 218. In addition to the display 220, a computer typically includes other peripheral output devices (not shown), such as speakers, printers, etc., that can present information to the user.

As shown in FIG. 2, the computer 202 may operate in a networked environment using logical connections via wired and/or wireless communications to one or more remote computers, such as a remote computer(s) 248. The remote computer(s) 248 may be a workstation, a server computer, a router, a personal computer, portable computer, microprocessor-based entertainment appliance, a peer device or other common network node, and typically includes many or all of the elements described relative to the computer 202, although, for purposes of brevity, only a memory storage device 250 is illustrated. The logical connections depicted include a local area network (LAN) 252 and a wireless local area network (WLAN) 254. Such networking environments are commonplace in homes and businesses. The Internet can also be used to provide access to remote computer 248.

When used in a LAN networking environment, the computer 202 is connected to the local network 252 through a wired or wireless communication network interface or adapter 256. The network adaptor 256 may facilitate wired or wireless communication to the LAN 252. When used in a WLAN networking environment, the computer 202 typically is connected to a communications server on the LAN, or has other means for establishing communications over the WLAN 254, such as the Internet. In a networked environment, program modules depicted relative to the computer 202, or portions thereof, may be stored in the remote memory storage device 250. The network connections shown are exemplary and other means of establishing a communications link between the computers may be used.

The computer 202 is operable to communicate with any other devices having wireless communication capability, e.g., a cell phone, a printer, desktop and/or portable computer, portable data assistant, and telephone. As discussed briefly above, suitable wireless technologies may include, but are not limited to, cellular, WLAN (e.g., IEEE 802.11), IEEE 802.16, IEEE 802.20, and Bluetooth.

IEEE 802.11, also commonly known as "Wifi", is a wireless communication protocol that enables computers to send and receive data anywhere within the range of a base station. A WLAN can be used to connect computers to each other, to the Internet, and to wired networks (which may use IEEE 802.3 or Ethernet communication protocols).

Examples of Image-Based Rendering of Real Scenes

Figure 3:
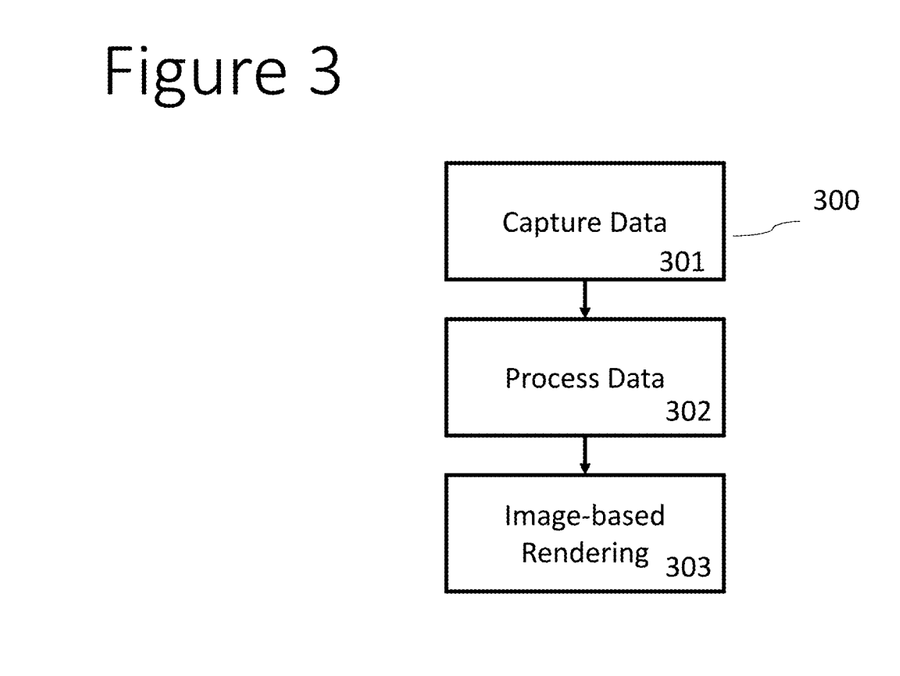
FIG. 3 shows a high level flow chart of the process of image-based rendering according to one embodiment of the invention.

FIG. 3 shows a high level flow chart 300 of the three primary steps in image-based rendering for real estate. In step 301, image data is captured. Image data may be captured by smartphones or other mobile devices, video cameras, digital SLR cameras, specialized cameras (e.g., other cameras that take spherical panoramic images), etc. Additional geometry data about a real scene may also be captured from laser range scanners, infrared structure light, or other data collection. In step 302, the captured image data is processed to create panoramas, determine camera geometry, and 3D reconstruction algorithms are employed to generate dense representations of a 3D model, geometric proxies, parcel maps and floor plans. In step 303, one or more rendering algorithms are applied to the data and 3D model to render a 3D view of the real estate property.

Figure 4:
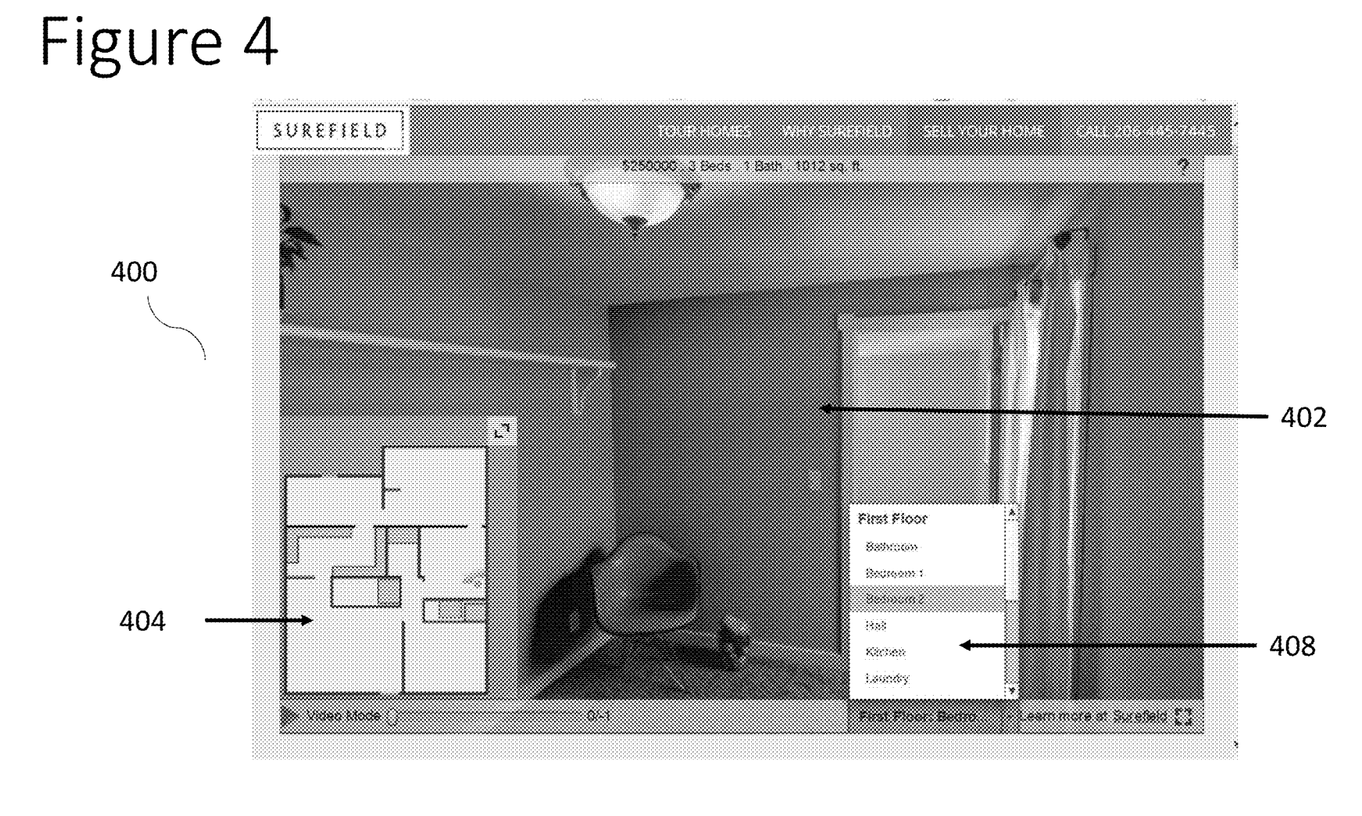
FIG. 4 shows a user interface for presenting image-based rendering or real property according to one embodiment of the invention.

FIG. 4 shows an embodiment of a User Interface System 400 for image-based rendering of real estate. Three different user interface elements serve the dual purposes of informing the user of his location in the model and simultaneously enabling spatial navigation. These three elements are shown in the user interface (400) embodiment of FIG. 4, which would normally be contained within a browser window, within a framed client application, or as the entire screen during full screen mode. User Interface element 402 is the viewpoint within a virtual model generated by combining geometry and image data using Image-Based Rendering (IBR), thus creating a 3-dimensional (3D) view. UI element 404 is a two-dimensional (2D) map overlay that displays the relative location in the virtual model of the current viewpoint 406 shown in UI element 402. UI element 408 is a text overlay that displays one or more labels associated with the user's location within the virtual model.

FIG. 4 shows the three primary user interface elements of an embodiment of the navigation tool for image-based renderings of real estate. UI element 402 shows a rendering of the model from a specific viewpoint position and also serves as a means to navigate to adjacent positions and to change the viewing vector from a fixed position. Navigation can occur using various well known input/output (IO) devices, such as a keyboard, touchscreen, eye-tracking technology, gesture recognition technology, or a computer mouse. For densely sampled spherical panoramas, one example of navigation using UI element 402 with a mouse would be to click on the rendered view to translate in the XY plane to another panorama location in the model. Another example of navigation using UI element 402 would be to click and hold the mouse button, enabling rotation about the Z axis, thus "looking around" without translating in the XY plane. As the user navigates, the rendered viewpoint shown in UI element 402 changes in real time based on a new position and viewing vector associated with the new location.

Many parts of the User Interface System 400 work together to create a unique user experience for touring a real estate environment over the Internet—in particular the 3D view rendered in UI element 402 warrants further discussion. In the 3D view of UI element 402, multiple IBR algorithms can be combined to create a user experience that overcomes the inherent tradeoff between photorealism and spatial navigation caused by using just one IBR algorithm exclusively. For example, dense spherical panoramas may be combined with the use of view dependent texture mapping (VDTM) during navigation as the user spatially translates and rotates the viewpoint with the virtual model.

The capture process (defining a spatial boundary, data sampling, and annotation) for an enhanced user experience involves a dense sampling of spherical panorama image data at multiple exposures (e.g., high definition rendering, HDR) and sampling of point cloud geometry from a hybrid camera and laser range scanning device. The processing pipeline (determining data sets, image calibration, image processing, 3D reconstruction (3DR) and scene understanding) operates on the data output from the capture process. Image calibration involves determining panorama pose and adding depth to each pixel of the panorama.

Image processing creates HDR spherical panoramas from input images. 3D reconstruction involves removing noise from point clouds, reconstructing a real estate environment's geometry to varying degrees of approximation, generating geometric proxies that describe the environment with simpler meta primitives, feature matching between spherical panoramas, positioning of spherical panorama data in 3D space, feature matching between the panorama and 3D space, and computing view dependent texture maps for the geometry and/or geometric proxies.

Rendering displays the processed data to an end-user via an IO device. During rendering, the user's position and navigation influence which elements of geometry and image data are combined for a given Image-Based Rendering algorithm at any possible location in or around the virtual model. Ground truth image data is the captured image associated with a particular capture location, and optionally may include any metadata associated with the captured image, such as GPS coordinates, IR point clouds, etc. Ground truth data may also include labels (outside: backyard, or groundfloor: bathroom) which are ground truth in the sense that they are directly collected at the scene and are not synthetic approximations. For example, when a user is near a position where ground truth image data is captured, very little geometry is required to render the most photorealistic view of the model. At the exact position of capture, the use of an image primitive is the most photorealistic view possible.

Composited image primitives such as a spherical panorama enable 2 DOF rotational navigation. When translating directly between two spherical panorama locations, other algorithms such as optical flow may provide more photorealistic warping during the rendering of predetermined translational pathways defined in the connectivity graph. When translating between other locations within the virtual model, the use of VDTM over explicit geometric proxies combined with depth and feature matching between nearby panoramas during rendering provides a decrease in photorealism but enables fluid movement to any spatial location.

In contrast to traditional texture maps, VDTMs compute new textures for different spatial positions, dynamically changing these as the user's spatial position changes. This dramatically reduces artifacts associated with appearance of objects. In various embodiments, rendering may use RGB spherical panoramas, point clouds, geometric proxies, view dependent texture mapping, and feature matching between the spherical panoramas and geometric proxies to create a fluid user experience involving multiple IBR algorithms that dynamically change based on the user's location, direction, and speed of movement within the model. A user can view ground truth image data or navigate to any other synthetic viewpoint in the same user interface, enjoying both photorealism and spatial navigation.

Figure 5:
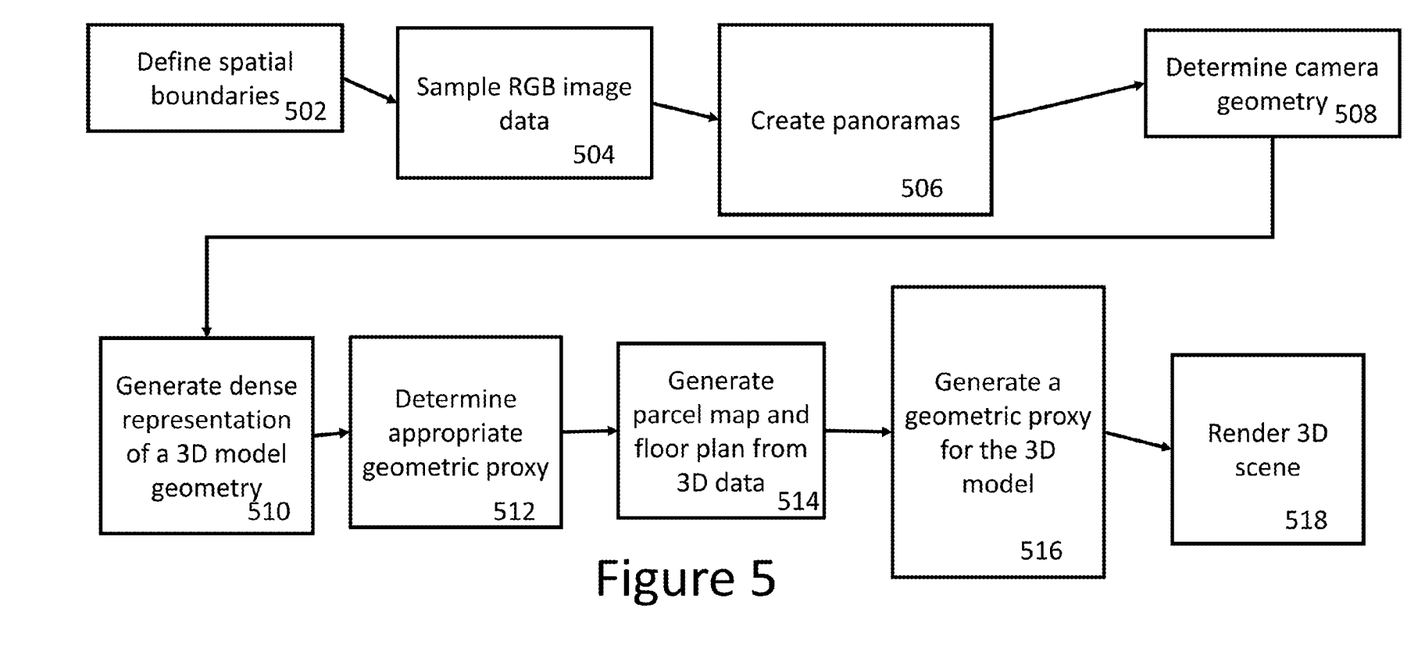
FIG. 5 shows a flow chart of a method of image-based rendering for real estate according to one embodiment of the invention.

FIG. 5 shows an embodiment of a computer-implemented image-based rendering (100) for providing a three-dimensional (3D) virtual model of a real property according to various aspects of the disclosed innovations.

In step 502, the system creates or generates the spatial boundaries in a model of the property that define the land (perhaps a parcel outline), structure (e.g., house, apartment, office, etc.), structure internals (e.g., bedrooms, kitchens, hallways, etc.) and/or air-space above the land (e.g., via quadcopter or pole-based data capture of aerial views).

In step 504, RGB image data is captured from each of the defined spatial boundaries. The captured RGB data may be annotated, during or after capture, according to the spatial boundaries or other factors. The use of computational photography approaches such as High Dynamic Range (HDR) can greatly decrease the amount of work spent during the RGB capture stage because special lighting of the scene is not necessary. HDR captures the same image at multiple exposure levels and combines them with post-processing so that an appropriate exposure level is applied to each area in the captured scene. In some embodiments, the use of HDR techniques allows for automatic adjustment for image exposure levels by selection of appropriate light levels for each pixel in the HDR images.

In step 506, panorama images are created from the RGB image data. In an alternative embodiment, High Dynamic Range (HDR) panoramas can be constructed by processing multiple overlapping input images having varying exposures to create composite higher contrast images that are optimally exposed.

In step 508, the camera geometry is determined by use of first pass feature detection within the panoramas in order to spatially calibrate the panoramas. The spatial boundary definitions may be used to group panoramas so that camera geometry is only found between line-of-site panoramas. A spherical panorama bundle adjustment heuristic can be used to group the panoramas. The bundle adjustment heuristic may be initialized with metadata such as GPS or wifi positioning coordinates associated with a sample capture location, gyroscopic or inertial data, or other spatial information.

In step 510, a second pass feature detection algorithm is applied to generate a dense representation of the 3D model geometry (e.g., high level features such as planes, lines, floors, etc.) or individual 3D points which can create a dense point cloud. Note that any other geometric data collected from the scene such as with a laser range scanner, infrared based depth maps (e.g., such as from a Microsoft Kinect), or other manual approaches can increase the accuracy of the geometry but are not required in the disclosed system. Some embodiments of the system work with images and do not use other geometric data.

In step 512, the geometry is converted into the correct geometric proxy based on the density of the data sampled during capture. The correct proxy is the one that can be combined with image data to create the most photorealistic synthetic viewpoint. The proxy is chosen from among various image-based rendering techniques such as view-dependent geometry, texture-mapped models, 3D warping, view-dependent texture, view morphing, view interpolation, mosaicking, concentric mosaics, light field, lumigraph, optical flow, stitching, rectification, color interpolation, blending, fall-off correction, etc., depending on tradeoffs between photorealism, desired amount of spatial navigation for the viewer (i.e., how much can the viewer vary the viewpoint), and the degree of data sampling.

IBR algorithms generally differ based on a variety of factors, including, but not limited to, the type of geometric proxy employed in rendering; the density of sampling that takes place during data capture; the types of devices and sensors used in data capture; or the degree of spatial navigation enabled in the rendering or viewing experience. In general, more geometry enables more spatial navigation and less dense sampling. Less geometry and more image sampling enable higher degrees of photorealism but less spatial navigation. All IBR algorithms have a trade-off between photorealism, spatial navigation, and the degree of data sampling. Also, photorealism can be increased for synthetic views by use of other geometric data such as laser/infrared but such geometric data is not required by the disclosed innovations for suitable results.

In step 514, the 3D data is used to generate a parcel map (e.g., the exterior and aerial views of the real estate) and floor plan. A 2D floor plan may be used to create a navigation-enabled map of the interior of the real estate. For example, a 2D floor plan of the rooms of a house can be automatically generated from the 3D data.

In step 516, the 3D data is used to generate a geometric proxy for the 3D model of the real property.

In step 518, the results are combined and a 3D scene that has photorealistic views from within a panorama capture location, as well as semi-photorealistic views from other locations using a geometric proxy and real image data (image-based rendering), are rendered to a viewer (end user). In addition to the 3D views, 2D floor plans are shown to the user as well as descriptive spatial boundary labels (i.e., one dimensional or 1D, such as a "list view" or a list of labels for different locations which map to the 3D model). In this way, the system can calculate and present a viewer with images of a real property in 3D, 2D, and 1D.

Figure 6:
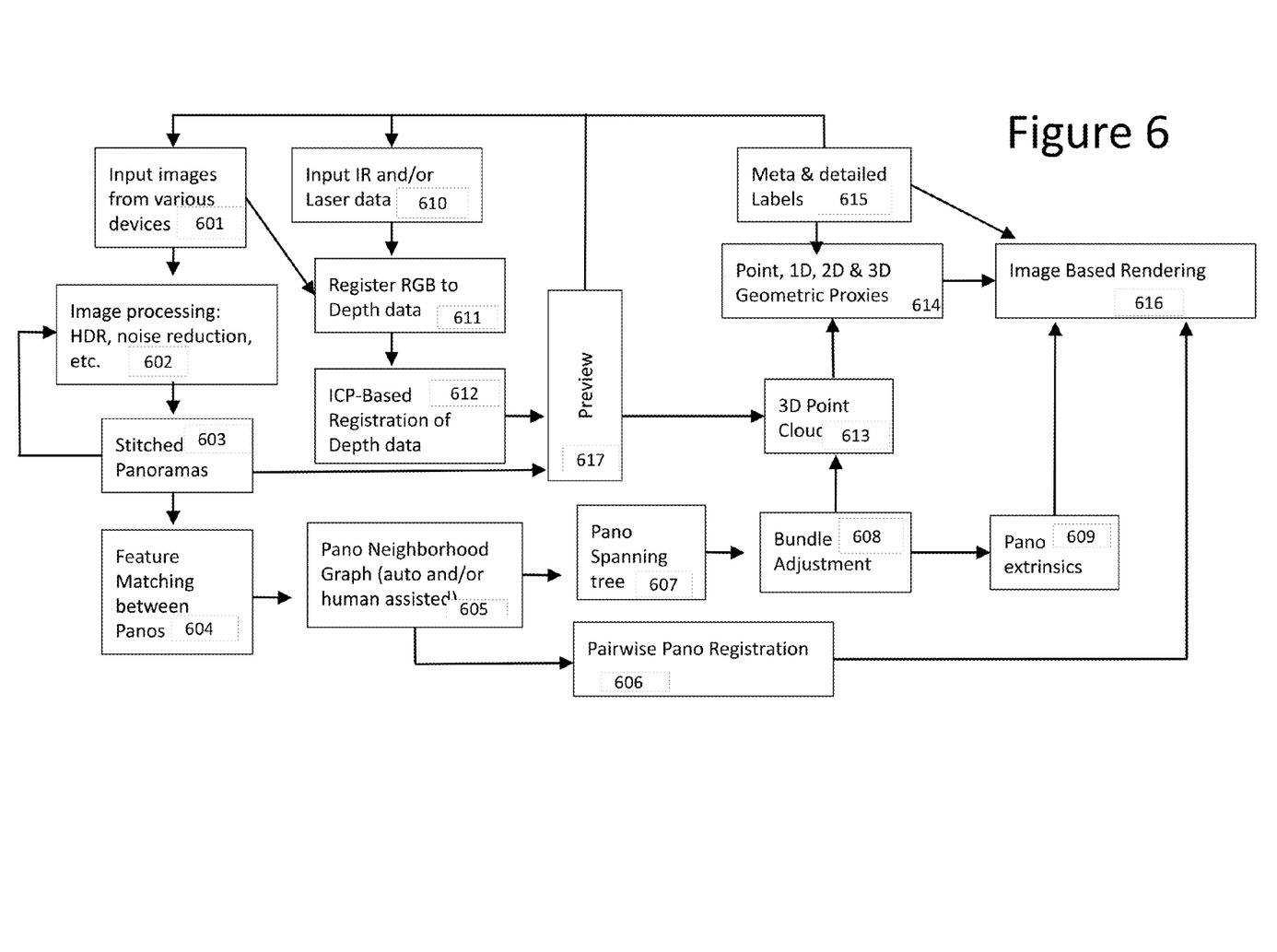
FIG. 6 shows a flow chart of a method of capturing and processing image data according to one embodiment of the invention.

FIG. 6 provides a detailed block diagram of an embodiment of a method of processing image data and associated data according to one or more of the disclosed innovations.

In step 601, input images are collected. The input images can come from various sources such as mobile devices (e.g., smartphones), point-and-shoot cameras, GoPros on a rig, and specialty cameras systems such as LadyBug5 from Point Grey. The input images can be shot with a tripod, or by holding the device in hand or on top of other devices such as drones, robots or other kinds of automated, semi-automated, or remote controlled devices. The output of such source devices is RGB information that may be stored on the local devices, streamed to nearby devices in real-time or in regular intervals, or transmitted to a remote storage device such as a server computer. The streaming of such RGB data can happen over WiFi or via wired communication channels such as high-speed USB links. The input image data can be collected as singular shots, burst mode pictures, or as a video. The RGB input capture may be coordinated with capture of depth data (e.g., step 611) in time or location.

The relative configuration between the locations of the RGB capture device and the depth capture device may be known in advance (rigid spatio-structural configuration) or it may be unconstrained (in which case their relative extrinsics will be approximated using computer vision techniques). In various embodiments, the input data may be captured by trained professional operators or by untrained consumers. Other data inputs can include GPS coordinates, indoor GPS coordinates, and approximate positions marked by a human operator on a floor plan. Additionally, in an alternative embodiment, a human operator can associate metadata such as tags with each image to represent the home, floor or room of the panorama (e.g., 615).

In step 602, the input images are processed using techniques such as white balancing, noise reduction, image stabilization, super-resolution, tone-mapping or other dynamic range compression techniques. Image processing can occur asynchronously or could be processed in real-time. In some embodiments it is possible to partially or fully process the data on the capture device. In other embodiments, the data may be uploaded/streamed to a remote server to be processed in order to take advantage of the server's greater processing power.

In step 603, images whose extrinsics primarily differ by a rotational component may be stitched into a spherical panorama, a cylindrical panorama or a flat mosaic. Stitching these images together may be done using relative camera extrinsics, feature matching, graph cut algorithms (e.g., Boykov), image blending, panorama weaving, and other similar techniques. The stitching may be done before or after the image processing techniques described in step 402. In some scenarios, such as a homeowner capturing images with a smartphone, it may be difficult to detect if a set of images make a panorama. In those cases, the user could be explicitly asked to capture images for a panorama. Alternatively, spatio-temporal coherence in the images may be used to detect panoramas.

In step 610, embodiments of the system optionally may collect depth data that may be spatio-temporally coherent with the RGB data (for example, the depth sensors could be very close to the RGB sensors and could be sampled at around the same time when the RGB sensors are sampled). The depth data is in addition to RGB data provided by camera devices and may come from different sources such as Infrared (IR), LASER, or structured light. The depth data may be coupled with RGB data in either an open or proprietary format. Other data inputs associated with the image data can include GPS coordinates, indoor GPS coordinates, and approximate positions marked by a human operator on a floor plan of the property.

In step 611, RGB data may be registered with depth data (sometimes herein referred to as RGB+D data) by using different heuristics such as using relative directional differences in the sensors (assuming the relative positions of the sensors is insignificant) or a per-pixel registration of the RGB and depth sensor data can be achieved by warping the depth image to the perspective of the RGB sensor image and computing per-pixel depth in the RGB space after processing the warped depths. In some embodiments, registering RGB data with depth data may be used to interpret a pixel location from a particular image as a 3D ray or vector for later use in mapping texture onto a 2-D or 3-D polygon mesh or a point cloud.

In step 612, a collection of RGB+D images may be registered together using an algorithm such as Iterative Closest Point (ICP) or other similar algorithms for reducing the difference between two clouds of points or geometric alignment of 3D models. Factors such as relative proximity of the depth images may be used to initialize the ICP algorithms. A globally consistent point may be obtained by pairing spatio-temporally neighboring depth images together and progressively merging locally registered point clouds into successively larger and more global point clouds. A distributed ICP algorithm may be employed to operate on local point clouds independently with successively larger point clouds being processed by larger individual nodes.

In step 617, an optional preview mode may be used to provide preliminary feedback regarding the quality of data and the quality of the eventual user experience. The preview feature may range from previewing raw sampled RGB and depth data, to previewing semi-processed images (eg., stitched panoramas, white balanced images, etc.) to previewing part or all of reconstructed imagery and geometry.

In step 604, the panorama image results of step 603 are further processed for feature mapping. Feature matching between panoramas is an important way to understand the relative spatial relationships between panoramas. Feature detection may be done using standard feature detectors such as SIFT, Harris corner detector, MSER detector, Canny edge detector, or SURF detector. In indoor environments, feature detection is also useful to find higher level features such as rectangles. The features may be matched using nearest neighbor, approximate nearest neighbor algorithms, or other non-parametric methods used for classification and regression. Additional constraints such as ratio tests or scale invariant feature tests may be used to improve the accuracy of the feature matches.

In step 605, a panorama neighborhood graph may be created. The feature matching information may be run on different pairs of panoramas to ascertain the spatial proximity of the panoramas. A proximity graph of the panoramas may then be obtained by connecting panoramas that have strong feature matches. Algorithms such as kd-tree nearest neighbor search may be used to perform fast feature matching between images. Alternatively, brute force search may be used, although generally less effectively. The panorama neighborhood graph may be also be constructed with the help of additional metadata information (e.g., room labels, GPS coordinates, etc) associated with the panoramas or a manually connected panorama graph. A weight is typically assigned to each edge to indicate the strength of the feature match between the edges of the panorama pairs. The weight can be computed by estimating the reprojection error after the relative extrinsics have been estimated.

In step 606, the panorama connectivity graph (neighborhood graph) constructed in step 605 may be used to estimate the relative extrinsics between panoramas. This information can be used to reduce the jarring effects when transitioning between these panoramas in the Image Based Rendering module.

In step 607, a spanning tree of the panorama neighborhood graph may be useful to simplify the initial extrinsics estimation because the panorama connectivity graph is a densely connected graph. The spanning tree can optionally be constructed so that it spans strongly connected clusters of panoramas (e.g., all the panoramas in the same room) as opposed to spanning individual panoramas. A root is chosen of this panorama spanning tree and the global extrinsic is propagated along the graph by using the relative extrinsics computed between the 2 panoramas of each edge. This global extrinsic may be used for the initial input to the panorama bundle adjustment process. In some embodiments, the initial estimates of the extrinsics may be improved by constraining the position and orientation of the panoramas using spanning tree limitations.

In step 608, bundle adjustment is the process of simultaneously estimating the 3D positions of the points corresponding to the matched features and extrinsics of the panoramas. Bundle adjustment attempts to minimize reprojection error between the image locations of observed and predicted image points (e.g., minimizing deviation from true image projections). A good outcome of bundle adjustment requires good initial estimates of the 3D point positions and the camera extrinsics. The likelihood of a good outcome is improved by detecting a feature in as many panoramas as possible. In other words, the higher the average number of panoramas in which a feature is detected, the higher the accuracy of the computed output. In one embodiment, a bundle adjustment formulation is implemented in which bundle adjustment is initially done on small clusters of strongly connected panoramas. This technique usually results in good local estimates. The small cluster bundle adjustments may then be merged one by one.

In step 609, computed global panorama extrinsics result from the bundle adjustment of step 608.

In step 613, the computed globally consistent 3D point cloud is derived from ICP-based registration of depth sensored data in step 612 and/or an output of bundle adjustment step 608.

In step 614, higher level geometric proxies are fit to the point cloud. These proxies may include line segments (1D), curves (1D), planes (2D), rectangles (2D), triangles (2D), and 3D voxel based volumetric representations. Several techniques such as noise elimination, Manhattan World assumptions, RANSAC-based plane fitting, and Poisson surface reconstruction can be used to derive higher level primitives representing the scene. Meta level representations of the scene such as the floor plan can be derived by simplification of these primitives.

In step 615, metadata may be optionally associated with images or portions of images to identify objects (eg., oven, fridge, etc.), to explain a space (eg., ways to use a physical space, etc.), to provide location information, etc. In one alternative embodiment, object metadata may be automatically determined by comparing an object's 3D image with a database of known images. A match (e.g, via comparison of point cloud data, image features, etc.) to a known image will result in identification of the object and the appropriate metadata may be imported from the database and associated with the newly identified object. As additional metadata, the creator of the virtual model may identify object attributes that are useful for advertisers, such as model numbers, color, physical size of opening or object, similar styles, etc. Knowing the physical size of an object or the size of the opening into which it fits allows for the advertisement of potential substitutes for the object. For example, knowing the size of the opening available for a refrigerator would allow the viewer to browse potential substitutes of the correct size from an advertiser.

In step 616, the stitched panoramas, the geometric information, raw captured input data, and metadata are then combined to achieve photo-realistic rendering using image-based rendering techniques.

Figure 7:
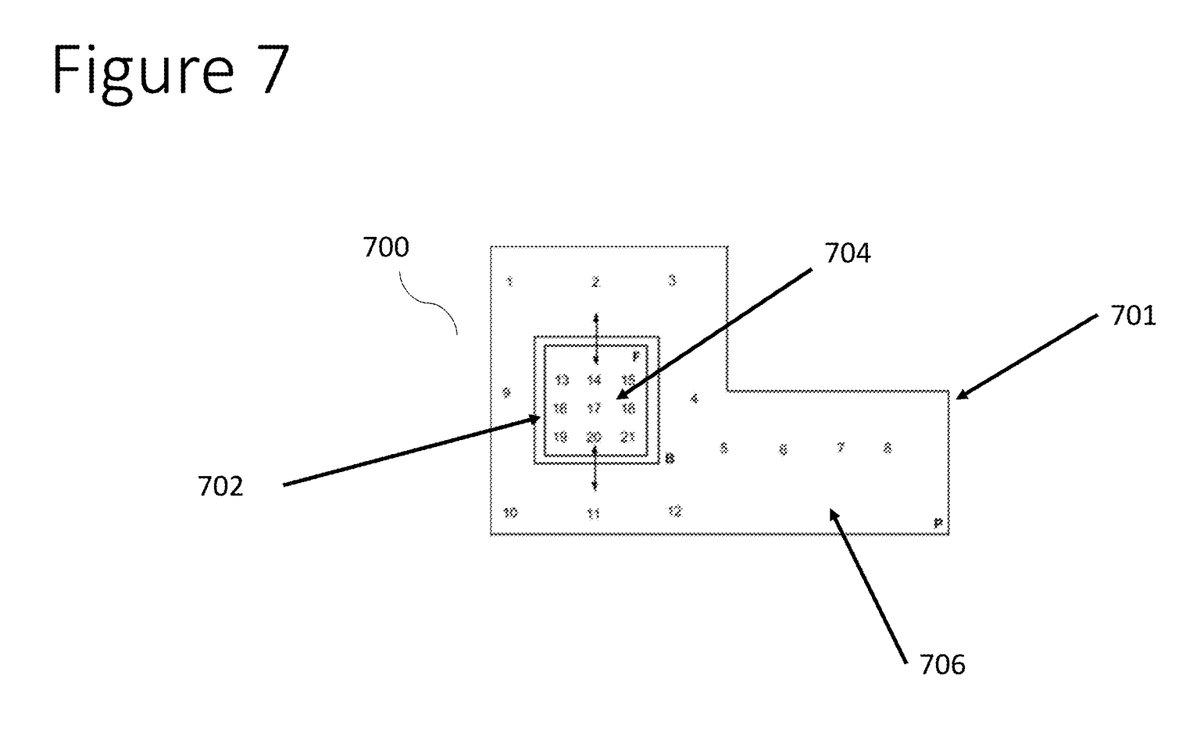
FIG. 7 shows a data capture map according to one embodiment of the invention.

FIG. 7 shows an example of a panorama capture map 700 having of a distribution of captured spherical panoramas on a parcel 701 having a house 702, where each number 1-21 represents a Data Sampling location (e.g., a location where a spherical panorama photo was taken). Note that different sampling densities in different spatial boundaries, such as dense sampling indoors 704 and sparse sampling outdoors 706. Details associated with the floor plan and topography are omitted. Two arrows shown between capture location 2 and 14 and 11 and 20 represent doors that connect the spatial boundaries in a connectivity graph. In later rendering stages, users will be able to move between the indoor and outdoor areas based on this connectivity graph. Additional details associated with the topography and the interior floor plan are omitted for clarity as are the actual density of the spherical panoramas.

FIG. 8 shows a flowchart of an exemplary embodiment of an image-based rendering method.

In step 801, a user may request different kinds of views as a user navigates a sampled RGB+D environment (e.g., a virtual model of house). In some instances, the user may request a view from the same location at which image data was captured. In other instances, the user may request a view from a location at which no image data was captured. If the user is navigating a sampled video path, for example, then the user may request a view from a location where a video frame was not captured. Or the user may want to jump off from the sampled path.

When a user is navigating panoramas, another type of view that a user may request is a transition between panoramas that is indicative of the physical experience of transitioning between the panorama capture locations in the real world. For example, the user may want to virtually move from the location where a panorama was captured to a nearby location where a different panorama was captured. Alternatively, the user may want to get an approximate view that involves significantly stepping away from the locations where the image data was captured. A smooth visual transition between the virtual locations avoids the visual dissonance of an abrupt image change.

At decision point 802, the rendering system evaluates the data at its disposal to aid the rendering of a requested viewpoint. If the viewpoint has been sampled as panorama, an image or as a video, then the rendering system can use the sampled raw and/or processed sensor-captured data to render the requested viewpoint in step 503. However, the requested viewpoint may be relatively far away from any sampled viewpoint. This is quite possible in real estate environments where the area can be very large (e.g., large homes, ranches, event spaces), acquisition can be difficult (e.g., view of the home from the top, heavy obstacles to accessing a region) or delicate (e.g., water ways, soft greenery, etc.). Such spaces may prohibit a denser image sampling of the region and require synthesis of novel viewpoints, step 804, at locations from which no image data was directly captured. As discussed in the explanation of FIG. 6, step 512, choosing an algorithm for novel viewpoint synthesis is typically a function of tradeoffs between photorealism, the desired amount of the quality and density of the available data, desired amount of spatial navigation for the viewer (i.e., how much can the viewer vary the viewpoint), and the degree of data sampling.

In step 807, light field rendering involves rendering a novel viewpoint by sampling the space of lights rays in and around the viewpoint's vicinity and reconstructing the light field at the requested viewpoint. If the sampling around the requested viewpoint is dense enough or the scene is not complicated enough (e.g., most of the complex geometry is very far away or there is very little RGB+D complexity in the vicinity of the requested view point) then the light field at the novel view point can be approximated by: 1) warping the RGB+D of the nearby sampled images to the new view point, 2) projecting the approximate depth map at the novel view point by synthetic rendering of the reconstructed geometry, 3) Using feature matching information to register the warped and synthetic geometry with respect to each other at the novel view point, 4) Run time rendering is then done using a warping, blending,-based or machine-learning-based approach to predict the object (and hence the RGB+D correspondence) at every pixel of the novel viewpoint. This requires an automated processing of the captured data to analyze if it lends itself to light field rendering. A 2D (or 3D) map is determined which identifies the areas where light field rendering is permissible. This map also stores the contributing sampled data at points in the permissible area. During render time, the sampled data is then used to render the novel view point. If the rendering is built on machine-learning based approaches, it may not be feasible to render in real time using a simple computing device. In such situations an offline or distributed rendering infrastructure is leveraged.

In step 805, view dependent texture mapping is a way to synthesize novel views by mapping different pre-captured/synthesized texture maps on the same approximate geometry. The resulting renderings tend to be a better viewpoint approximation. A 2D (or 3D) map is determined which identifies the areas where light field rendering is permissible. In each such region, the visible geometry and the permissible view-dependent texture maps for each polygonal element of the geometry are computed. At render-time, the right texture map to use is determined for each polygon depending on the rendering viewpoint.

In step 806, pure synthetic rendering from geometric proxies involves rendering captured/reconstructed geometry along with the computed texture maps.

In step 808, the final rendering chosen for novel view synthesis depends on the situational accuracy of the various rendering algorithms. The accuracy of rendering at a given location can be estimated using techniques such as reprojection errors, average texture warp distortions, average distance to sampled view points, etc. Depending on the estimated accuracy of various novel viewpoint synthesis algorithms, the estimation transitional speed of the viewer and the clarity of rendering expected by the user, the final rendering algorithm may be a weighted blend of two or more of the results of the various novel viewpoint synthesis algorithms from steps 805, 806 and 807.

Aspects of the invention described above may be stored or distributed on computer-readable media, including magnetic and optically readable and removable computer discs, as well as distributed electronically over the Internet or over other networks (including wireless networks). Those skilled in the relevant art will recognize that portions or embodiments of the invention may also reside in a fixed element of a communication network such as a server or database, while corresponding portions may reside on a mobile communication device, such as a laptop computer, Personal Digital Assistant ("PDA"), or mobile phone. Data structures and transmission of data particular to aspects of the invention are also encompassed within the scope of the invention.

In accordance with the practices of persons skilled in the art of computer programming, embodiments of the invention are described with reference to acts and operations that are performed by computer systems. Such computer-executed acts and operations may be performed by an operating system (e.g., Microsoft Windows, Linux, Apple iOS, Android) or an application program. The acts and operations include the manipulation by the CPU of electrical signals representing data bits and the maintenance of data bits at memory locations to operate the computer systems and process signals. The memory locations where data bits are maintained are physical locations that have particular electrical, magnetic, or optical properties corresponding to the data bits. Although databases are shown as separate physical/logical entities for clarity, they may be combined and/or aggregated to suit the physical/logical architecture of the system in which they are used.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

The above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not necessarily the embodiments described herein. These and other changes can be made to the invention in light of the detailed description.

These and other changes can be made to the invention in light of the above detailed description. In general, the terms used in the following claims should not be construed to be limited to the specific embodiments disclosed in the specification, unless the above detailed description explicitly defines such terms. Accordingly, the actual scope of the invention encompasses the disclosed embodiments and all equivalent ways of practicing or implementing the invention under the claims.

In view of the many possible embodiments to which the principles of this invention may be applied, it should be recognized that the detailed embodiments are illustrative only and should not be taken as limiting the scope of the invention. Thus, we claim as our invention all such embodiments as may come within the scope and spirit of the following claims and equivalents thereto.

What is claimed is:

1. A method, comprising:
receiving image data of a plurality of spaces in a property, the image data including a plurality of images captured from a plurality of viewpoints;
creating a plurality of panoramas of the plurality of spaces using the image data;
rendering a virtual model of a selected space among the plurality of spaces using the plurality of panoramas;
causing a device to display the virtual model with a first label indicating a location of the selected space; and
defining spatial boundaries of the plurality of spaces in the property using the image data, the plurality of spaces including a plurality of rooms in the property,
wherein the image data includes metadata associated with the plurality of images, the metadata indicating capture locations of the images,
wherein rendering the virtual model of the selected space includes rendering a 3D scene of the selected space using the plurality of panoramas, and
wherein rendering the 3D scene includes:
determining camera geometry using the plurality of images;
receiving a selected viewpoint in the selected space;
generating a point cloud of the 3D model;
determining a geometric proxy for the selected viewpoint using the determined camera geometry and the point cloud; and
generating the 3D model using the geometric proxy.

2. The method of claim 1, further comprising:
calibrating the plurality of panoramas using the camera geometry,
wherein the camera geometry is determined by a first pass feature detection using the plurality of images.

3. The method of claim 1, wherein the plurality of panoramas are grouped according to a panorama bundle adjustment heuristic.

4. The method of claim 3, wherein the panorama bundle adjustment heuristic is initialized using the metadata, the metadata including one or both of GPS and WiFi positioning coordinates.

5. The method of claim 1, further comprising:
generating the plurality of spatial boundaries of the plurality of spaces using the plurality of images, each of the spatial boundaries defining a parcel outline of one of the plurality of spaces;
annotating the plurality of images with second labels indicating capture locations of the plurality of images using the plurality of spatial boundaries; and
identifying the selected space among the plurality of spaces where a selected viewpoint is located using the second labels,
wherein causing the device to display the virtual model with the first label indicating the location of the selected space includes visually presenting the virtual model on a first portion of a user interface, a map overlay on a second portion of the user interface, and a text overlay on a third portion of the user interface, the map overlay indicating a position of the selected viewpoint in the selected space, the text overlay including the second label identifying the selected space in the property where the selected viewpoint is located.

6. The method of claim 1, further comprising:
obtaining depth data of the plurality of spaces,
wherein creating the plurality of panoramas of the plurality of spaces includes generating a plurality of stitched panoramas from the plurality of images, the metadata, and the depth data.

7. The method of claim 6 wherein generating the plurality of stitched panoramas includes:
generating a panorama neighborhood graph of the property;
generating a panorama spanning tree of the panorama neighborhood graph; and
performing panorama bundle adjustment on the panorama spanning tree.

8. The method of claim 6, rendering the virtual model includes registering image RGB data from the plurality of images with the depth data to generate a 3D point cloud.

9. The method of claim 1, further comprising:
receiving the plurality of images from a smart phone.

10. A system, comprising:
a processor;
a memory storing non-transitory program commands, which, when executed by the processor, cause the processor to:
receive image data of a plurality of spaces in a property, the image data including a plurality of images captured from a plurality of viewpoints;
create a plurality of panoramas of the plurality of spaces using the image data;
render a virtual model of a selected space among the plurality of spaces using the plurality of panoramas;
cause a device to display the virtual model with a first label indicating a location of the selected space,
wherein the image data includes metadata associated with the plurality of images, the metadata indicating capture locations of the images,
wherein the program commands cause the processor to render the virtual model of the selected space by rendering a 3D scene of the selected space using the plurality of panoramas, and
wherein the program commands cause the processor to render the 3D scene by:
determining camera geometry using the plurality of images;
receiving a selected viewpoint in the selected space;
generating a point cloud of the 3D model;
determining a geometric proxy for the selected viewpoint using the determined camera geometry and the point cloud; and
generating the 3D model using the geometric proxy.

11. The system of claim 10, wherein the program commands further cause the processor to:
obtain depth data of the plurality of spaces, and
wherein the program commands cause the processor to create the plurality of panoramas of the plurality of spaces by generating a plurality of stitched panoramas from the plurality of images, the metadata, and the depth data.

12. The system of claim 10, wherein the program commands further cause the processor to:
generate a plurality of spatial boundaries of the plurality of spaces using the plurality of images, each of the spatial boundaries defining a parcel outline of one of the plurality of spaces;
annotate the plurality of images with second labels indicating capture locations of the plurality of images using the plurality of spatial boundaries; and
identify the selected space among the plurality of spaces where a selected viewpoint is located using the second labels,
wherein the program commands cause the processor to cause the device to display the virtual model with the first label indicating the location of the selected space by visually presenting the virtual model on a first portion of a user interface, a map overlay on a second portion of the user interface, and a text overlay on a third portion of the user interface, the map overlay indicating a position of the selected viewpoint in the selected space, the text overlay including the second label identifying the selected space in the property where the selected viewpoint is located.

13. A method, comprising:
receiving image data of a plurality of spaces in a property, the image data including a plurality of images captured from a plurality of viewpoints;
creating a plurality of panoramas of the plurality of spaces using the image data;
rendering a virtual model of a selected space among the plurality of spaces using the plurality of panoramas;
causing a device to display the virtual model with a first label indicating a location of the selected space; and
obtaining depth data of the plurality of spaces,
wherein creating the plurality of panoramas of the plurality of spaces includes generating a plurality of stitched panoramas from the plurality of images, the metadata, and the depth data, and
wherein generating the plurality of stitched panoramas includes:
generating a panorama neighborhood graph of the property;
generating a panorama spanning tree of the panorama neighborhood graph; and
performing panorama bundle adjustment on the panorama spanning tree.

14. The method of claim 13, wherein the image data includes metadata associated with the plurality of images, the metadata indicating capture locations of the images, and
wherein rendering the virtual model of the selected space includes rendering a 3D scene of the selected space using the plurality of panoramas.

15. The method of claim 14, further comprising:
obtaining depth data of the plurality of spaces,
wherein creating the plurality of panoramas of the plurality of spaces includes generating a plurality of stitched panoramas from the plurality of images, the metadata, and the depth data.

16. The method of claim 14, further comprising:
defining spatial boundaries of the plurality of spaces in the property using the image data, the plurality of spaces including a plurality of rooms in the property.

17. The method of claim 16, further comprising:
calibrating the plurality of panoramas using camera geometry,
wherein rendering the 3D scene includes:
determining the camera geometry using the plurality of images;
receiving a selected viewpoint in the selected space;
generating a point cloud of the 3D model;
determining a geometric proxy for the selected viewpoint using the determined camera geometry and the point cloud; and
generating the 3D model using the geometric proxy, and wherein the camera geometry is determined by a first pass feature detection using the plurality of images.

18. The method of claim 13, wherein the plurality of panoramas are grouped according to a panorama bundle adjustment heuristic.

19. The method of claim 18, wherein the panorama bundle adjustment heuristic is initialized using the metadata, the metadata including one or both of GPS and WiFi positioning coordinates.

* * * * *